P. M. GERVIG.
VEHICLE AWNING.
APPLICATION FILED AUG. 30, 1919.
1,336,953. Patented Apr. 13, 1920.
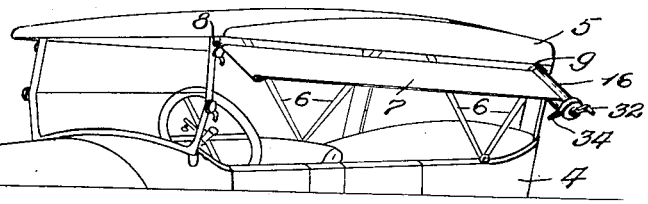
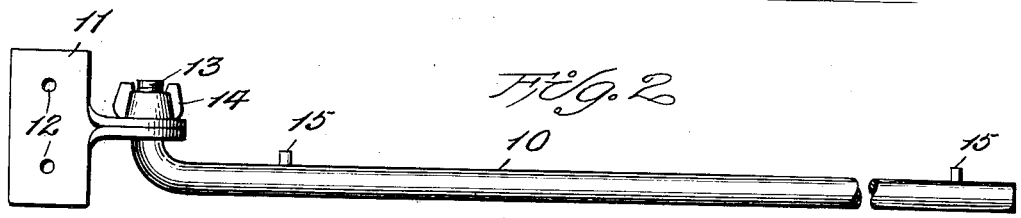
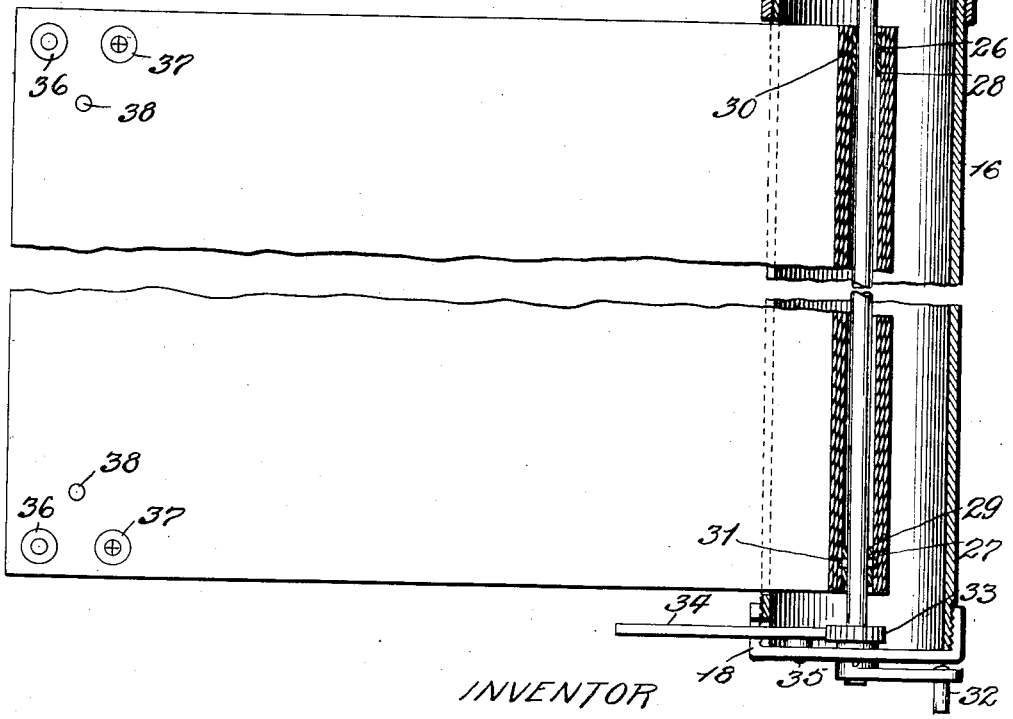
INVENTOR
PHILIP M. GERVIG,
by Arthur C. Eckert
ATTORNEY.

UNITED STATES PATENT OFFICE.

PHILIP MARZOLF GERVIG, OF ALTON, ILLINOIS, ASSIGNOR OF ONE-HALF TO FRANK ORMOND WHITE, OF BELLEVILLE, ILLINOIS.

VEHICLE-AWNING.

1,336,953.  Specification of Letters Patent.  Patented Apr. 13, 1920.

Application filed August 30, 1919. Serial No. 320,855.

*To all whom it may concern:*

Be it known that I, PHILIP MARZOLF GERVIG, a citizen of the United States, and resident of Alton, Illinois, have invented certain new and useful Improvements in Vehicle-Awnings, of which the following is a specification containing a full, clear, and exact description, reference being had to the accompanying drawings, forming a part hereof.

The object of my invention is to produce a vehicle awning particularly adapted for use on automobiles. In an ordinary automobile top, no means are provided for protecting the occupants of the automobile from the direct and reflected rays of the sun. My device provides means for selectively securing an awning to a machine at various angles with the sides of the top, and provides for its quick removal when desired. My awning can be easily made, of cheap material and minimum labor charge, will not mar the appearance of the vehicle top and can be removed or attached in a minimum of time and adjusted to the desired angle by a simple operation of turning several screws.

With the above purposes in view, my invention consists in certain novel features of construction and arrangements of parts, as will be hereinafter more fully described, pointed out in the claims and illustrated by the accompanying drawings in which—

Figure 1 is a fragmental perspective elevation of an automobile body and top with my device attached in operative position.

Fig. 2 is a plan of one of the awning supports used in my device, and

Fig. 3 is a fragmental sectional elevation of the hollow cylinder showing the awning used in my device.

Numeral 4 designates the body and 5 the top of a conventional automobile, the top being secured to the body by means of the bows 6.

My awning 7 is secured to the side bow of the top 5 near its front end at 8 and to the bow 6 at 9 at the other ends.

Numeral 10 designates the front awning support revolubly secured in the eye of the plate 11, which is firmly secured to the top 5 at 8 by means of screws through the holes 12. The bent end of the awning support is threaded at 13 to permit the butterfly nut 14 to be screwed thereon. The plate 11 is secured to the top 5 so that the support 10 may be rotated in a vertical plane. Numeral 15 designates pins projecting from the support 10 to engage the awning as hereinafter described.

Numeral 16 designates a cylinder having the screw caps 17 and 18. Into the cap 17 by threaded engagement is secured the bent rod 19 which is threaded at its free end at 20. The butterfly nut 21 is secured by threaded engagement to said free end at 20.

Numeral 22 designates a clip which is held together by the bolt end 23 of the arm 24; 25 designates a nut secured to the bolt end 23. The arm 24 is revolubly secured to the free end at 20 of the bent rod 19. By means of the clip 22, the arm 24, and the bent rod 19, the cylinder 16 is secured to the bow of the top in the position shown in Fig. 1, permitting the cylinder to be rotated within limits in a vertical plane. The cylinder 16 acts both as a container and end support of the awning 7.

Numeral 25ª designates a stem passing through the cap 18 and into the cap 17, as shown in Fig. 3, said stem being revolubly secured in both caps. A longitudinal slot is formed in the lateral surface of said cylinder 16 extending its entire length. The awning 7 is secured to the stem 25ª at 26 and 27 by means of sleeves 28 and 29 which are keyed to the stem 25 by means of the keys 30 and 31.

Numeral 32 designates a crank secured to the external end of the stem 25ª. The awning extends through the longitudinal slot formed in the cylinder 16. By a turning of the crank 32, the awning 7 may be wrapped or unwrapped on the stem 25, depending on the direction of rotation. A ratchet 33 is firmly secured to the stem 25 on the inside of the cap 18. A pawl 34, extending through the cylinder 16, as shown in Fig. 3, is rotatively secured to the cap 18 by means of the rivet 35. The pawl 34 is positioned in alinement with the ratchet 33 so that the rotation of the stem 25ª can be prevented and the awning locked in a predetermined position by a movement of the pawl 34.

Numerals 36 and 37 designate snap fasteners fastened into the awning 7, as shown in Fig. 3, and 38 designates perforations in the awning 7 in the positions shown.

When my device is attached and assembled, as shown in Fig. 1, the awning 7 is wrapped around the support 10, so that the projections 15 extend through the apertures 38 and the fasteners 36 are snapped into the fasteners 37.

Additional supports, such as 10, may be positioned intermediate the length of the top without departing from my invention.

What I claim and mean to secure by Letters-Patent is—

In combination with a vehicle awning, a hollow cylinder with a longitudinal opening in its lateral surface, a stem, said stem projecting longitudinally concentrically through said cylinder and revolubly secured thereto, said awning secured to said stem and passing through the longitudinal opening of said hollow cylinder, a vehicle top, said cylinder secured to one end of said vehicle top, an awning support secured at the opposite end of said top, and means for selectively varying the angularity in position of said cylinder and awning support and hence of said awning without any external means, and means for selectively fastening the free end of said awning to said awning support, a pawl and ratchet positioned at one extremity of said cylinder and secured to said stem, thereby limiting the movement of said awning relative to said cylinder.

In testimony whereof I have signed my name to this specification, in presence of two subscribing witnesses.

PHILIP MARZOLF GERVIG.

Witnesses:
WILLIAM HILKERBAUMER,
IDA MAE BROWN.